United States Patent
Walker et al.

(10) Patent No.: US 6,321,010 B1
(45) Date of Patent: Nov. 20, 2001

(54) OPTICAL MICROSTRUCTURE AND METHOD OF MANUFACTURE

(75) Inventors: James A. Walker, Howell; Keith W. Goossen, Aberdeen; Dennis S. Greywall, Whitehouse Station; Alexandru Paunescu, Neshanic Station; John V. Gates, II, New Providence, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/385,751

(22) Filed: Aug. 30, 1999

(51) Int. Cl.[7] ................ G02B 6/30; G02B 6/26
(52) U.S. Cl. .................. 385/49; 385/14; 385/51; 385/88; 385/92; 385/39; 250/227.19; 250/227.24; 250/230
(58) Field of Search .................. 385/51, 49, 14, 385/88, 92, 39; 250/227.19, 227.24, 230

(56) References Cited

U.S. PATENT DOCUMENTS

| | | | |
|---|---|---|---|
| 4,711,246 | * 12/1987 | Alderson | 600/480 |
| 4,787,396 | * 11/1988 | Pidorenko | 600/480 |
| 4,924,870 | * 5/1990 | Wlodarczyk et al. | 600/480 |
| 5,212,746 | * 5/1993 | Miller et al. | 385/25 |
| 5,247,171 | * 9/1993 | Wlodarczyk et al. | 250/227.21 |
| 5,373,261 | * 12/1994 | Higgins et al. | 331/66 |
| 5,500,761 | 3/1996 | Goossen et al. | 359/290 |
| 5,559,358 | * 9/1996 | Burns et al. | 257/431 |
| 5,589,974 | 12/1996 | Goossen et al. | 359/290 |
| 5,625,733 | * 4/1997 | Frigo et al. | 385/88 |
| 5,647,044 | * 7/1997 | Basavanhally et al. | 385/92 |
| 5,654,819 | 8/1997 | Goossen et al. | 359/291 |
| 5,692,083 | * 11/1997 | Bennett | 385/88 |
| 5,701,193 | * 12/1997 | Vogel et al. | 359/290 |
| 5,739,945 | * 4/1998 | Tayebati | 359/291 |
| 5,767,997 | 6/1998 | Bishop et al. | 359/152 |
| 5,808,781 | 9/1998 | Arney et al. | 359/291 |
| 5,831,262 | 11/1998 | Greywall et al. | 250/227.14 |
| 5,835,645 | * 11/1998 | Jorgenson et al. | 385/12 |
| 5,870,511 | * 2/1999 | Sawatari et al. | 385/12 |

OTHER PUBLICATIONS

K. Aratani, et. al. "Process and Design Considerations for Surface Micormachined Beams for a Tuneable Interferometer Array in Silicon," Proc. IEEE Micro. Electromech. Workshop, Ft. Lauderdale, FL Feb. 7–10, 1993, pp. 230–235.

* cited by examiner

Primary Examiner—Evelyn A Lester
(74) Attorney, Agent, or Firm—Hedman & Costigan, P.C.

(57) ABSTRACT

An article and method including an optical fiber coupled to a microstructure which is easily manufactured. The microstructure is comprised of a plurality of layers including a receptacle layer and a movable layer. The optical fiber has a high reflectivity terminal end forming the non-movable layer. The receptacle layer has an opening aligned with the movable layer for receiving the terminal end of the optical fiber. The optical fiber is inserted into the opening and the receptacle layer and fixed in relation to the microstructure, so as to form cavity between the terminal end of the fiber and the movable layer of the microstructure. The movable layer is physically adapted for moving relative to the non-movable layer under the influence of an actuating force. Additionally a method of manufacture of forming a microstructure comprising a receptacle layer having an opening therein and a movable layer, inserting a terminal end of an optical fiber into the opening, and affixing the optic fiber to the microstructure.

28 Claims, 3 Drawing Sheets

OPTICAL MICROSTRUCTURE AND METHOD OF MANUFACTURE

FIELD OF THE INVENTION

The present invention relates to micro-structural optical devices having a movable membrane for generating optical interference effects and the like.

BACKGROUND OF THE INVENTION

Microstructural devices having a movable membrane for creating optical interference effects may be used in a variety of applications. For example, such devices are useful as high speed, inexpensive optical modulators for optical communications systems.

The theory underlying the performance and mechanical response of fiber optical microstructures configured for measuring pressure and temperature is generally described in Greywall et. al, U.S. Pat. No. 5,831,262 (hereinafter Greywall et. al '262). Additional description concerning the design of micromechanical optical modulators may be found in U.S. Pat. No. 5,500,761 and U.S. Pat. Nos. 5,654,819 and 5,589,974.

The microstructure may be suitably structured for example as a Fabrey-Perot device having equal reflectivity mirrors as generally described in Aratani' et al., "Process and Design Considerations for Surface Micromachined Beams for a Tunable Interferometer Array in Silicon", Proc. IEEE Micro. Electromech. Workshop, Ft. Lauderdale, Fla., Feb. 7–10, 1993, pp. 230–235.

Using such devices in optical systems requires optical coupling to waveguides such as optical fibers. Optical coupling, however, may be problematic. Greywall et al. described an Article Comprising An Optical Fiber Attached To A Micromechanical Device in Greywall et. al '262 in which an optical fiber is integrally attached to a microstructure. In Greywall et al. '262 a layer of cement and a layer of glass are index matched to the index optic fiber, i.e. the layers and the fiber have the same index of refraction. The glass layer provides support for an adjacent layer of the microstructure. Integration of the fiber with the microstructure was taught to eliminate or reduce the interference effects that would otherwise occur if the fiber end and the microstructure were spaced.

The fabrication of the microstructure as described in Greywall et al. '262 includes silicon nitride or polysilicon which is deposited on the first side of a silicon wafer. A "pill" of readily etchable sacrificial material is then deposited on the first layer. A second layer side composed of silicon nitride or polysilicon, is deposited on top of the pill and then a layer of glass is deposited over the second layer. The wafer is etched from the second side to the first layer. Also, holes are etched into the first layer through a conductive layer if present. The etchant is delivered through the holes to the pill of the sacrificial material sandwiched between the first and the second layer. The sacrificial material is etched away, releasing the first layer.

Since the manufacturing procedure of Greywall et al. '262 requires use of a pill of readily sacrificial material and removal of the sacrificial layer through the holes etched through the first layer, the "pill" must be precisely deposited over the first layer if the gap formed after the sacrificial layer is removed is to have the needed dimensions. In addition, the procedure includes etching holes in order to remove the sacrificial layer. The holes in turn may interfere with the structural properties of the movable membrane or may have to be plugged.

Greywall et al. '262 also describes that the terminal end of the fiber be connected to the flat surface of the glass via a layer of cement between the terminal end of the fiber and the glass. As such, the cement composition must be index matched and have suitable bonding properties to attach the fiber to the glass.

SUMMARY OF THE INVENTION

The present invention is directed to an article having an optical fiber coupled to a microstructure which is easily manufactured. The microstructure is comprised of a plurality of layers including a receptacle layer and a movable layer.

The optical fiber has a high reflectivity terminal end forming the non-movable layer. The receptacle layer has an opening aligned with said movable layer for receiving the terminal end of the optical fiber. The optical fiber is inserted into the opening in the receptacle layer and is fixed in relation to the microstructure, so as to form a cavity between the terminal end of the fiber forming the non-movable layer and the movable layer of the microstructure. The movable layer is physically adapted for moving relative to the non-movable layer under the influence of an actuating force.

The microstructure may also include a spacer layer which defines the distance between the movable layer and the non-movable layer.

The present invention can be used as an optical microphone with remote sensing capability, an article to measure pressure and an article to measure temperature.

Additionally, the present invention relates to a method of manufacture of the article by forming a microstructure comprising a movable layer and a receptacle layer having an opening therein, inserting a terminal end of an optical fiber into said opening, and affixing the optic fiber to the microstructure.

BRIEF DESCRIPTION OF THE DRAWINGS

Further features of the invention will become apparent from the following detailed description of the specific embodiments when read in conjunction with the accompanying drawings, in which.

DETAILED DESCRIPTION OF THE PREFERRED EMBODIMENT

The present invention is directed to an article having an optical fiber 18 coupled to a microstructure 8. The article can be used to modulate an optical signal in response to physical events such as sonic energy, temperature or pressure.

Figure 1:
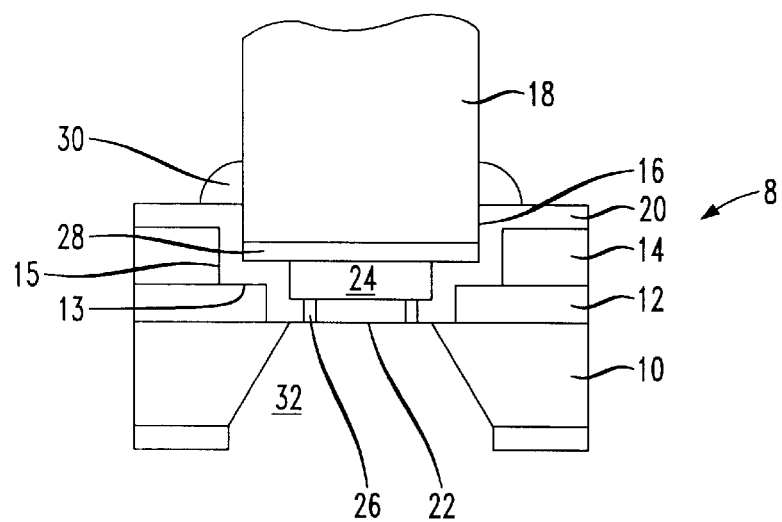
FIG. 1 shows a first embodiment of an article according to the present invention wherein the microstructure is configured to modulate an optical signal in response to sonic energy.

Turning to the drawings illustrating preferred embodiments of the present invention, FIG. 1 shows a cross sectional view of an optical microphone with remote sensing capabilities. The article of manufacture includes an optical fiber 18 having a highly reflective coating forming a non-movable layer 28 on the face of the terminal end. The terminal end of the optical fiber 18 is fixed within the microphone of FIG. 1 which includes a movable layer 22 responsive to sonic energy.

The microstructure 8 preferably comprises a silicon wafer 10 having a portion removed to form a chamber 32. Defining the top of the chamber 32 is a movable layer 22. A receptacle 16 is formed through the use of a receptacle layer 14 in the microphone 8 above the movable layer 22 to accept and align the non-movable layer 28 of optic fiber 18 with the movable layer 22 of the microphone 8.

A cavity 24 exists between the non-movable layer 28 of the optical fiber 18 and the movable layer 22 of the microphone 8. The distance between the nonmovable layer 28 and the movable layer 22 is defined by a spacer layer 12 deposited on the surface of the silicon wafer 10 of the microphone 8, as further described below.

The non-movable layer 28 on the face of the terminal end of the optical fiber 18 is aligned with the movable layer 22 of the microstructure 8 through the use of the receptacle 16. The receptacle 16 is created by a receptacle layer 14 deposited on the spacer layer 12 of the microstructure 8. The receptacle layer 14 is preferably made of phosphosilicate glass film or a similar composition and preferably has a thickness sufficient to properly align a fiber optic cable 18. The receptacle layer 14 has an opening 15 therein which is aligned with the cavity 24, the non-movable layer 22 and the chamber 32 of the microstructure 8.

In its most preferred embodiment, the movable layer 22 of the microstructure 8 is a portion of a film layer 20 formed over the wafer layer 10, spacer layer 12 and receptacle layer 14 including the openings in the spacer layer 12 and receptacle layer 14. As shown, the opening in the spacer layer 12 is of a smaller diameter, and therefore extends further into the opening 15, than the opening in the receptacle layer 14. The film layer 20 covers the receptacle layer 14 and the spacer layer 12, arranged in the described stepwise fashion, including the exposed tops and sides of these layers 12 and 14. The film layer 20 in the area where the chamber 32 is formed acts as the movable layer 22 in the preferred embodiment.

Determination of various dimensions of the layers, coatings and gaps are dependent on the wavelength ($\lambda$) of the light passed through the optical fiber. Generally, applications up to 300 meters from the device use a light of 0.850 micron wavelength, however, if the distance is over 300 meters a light having a wavelength of about 1.30 micron is standard.

The spacer layer 12 is preferably thermally grown to a specific thickness in relation to the wavelength of light used in the optical microstructure 8 as described above. The distance between the movable layer 22 and the non-movable layer 28 at equilibrium is preferably determined by the formula $$\frac{m\lambda}{2} \pm \epsilon$$

wherein m is a whole number and $\epsilon$ is between 0 and $\lambda/10$ with $\lambda/20$ being most preferred. In this most preferred embodiment, the equilibrium is on the steepest slope of the graph of FIG. 2 to provide the greatest response in reflectivity when an actuating force is applied to the movable layer 22.

The opening 15 in the receptacle layer 14 is created so that, after the film layer 20 is deposited on the microstructure 8, the optical fiber 18 is easily aligned in its x and y coordinates when inserted. Since the spacer layer 12 extends into the opening beyond the receptacle layer 14, it forms a stop 13 against which the terminal end of the optical fiber 18 rests to align the terminal end of the optic fiber in the z coordinate. This arrangement allows for passive packaging techniques to be used wherein the x and y positions of the optical fiber 18 are defined by the opening 15 layer 14 and the z position is defined stop 13 of the spacer layer 12, preferably both covered by the film layer 20. The terminal end of the optical fiber 18 is preferably fixed in the receptacle 16 by cement or solder 30 about at least a portion of the perimeter of the fiber 18.

In the preferred embodiment the film layer 20 is deposited over the receptacle layer 14 and spacer layer 12 in stepwise fashion. The film layer 20 is preferably silicon nitride or some other reflective material whereas it comprises the movable layer 22. It is preferred that the film layer 20 can have a refractive index of about 1.9 to 2.2, and most preferably 2.0. The film layer 20 has a thickness being an odd multiple of ¼$\lambda$, and preferably is about ¼$\lambda$ or ¾$\lambda$ thick.

In determining the thickness of the film layer 20, and therefore the movable layer 22, there is a trade off between the manufacture process and the responsiveness of the movable layer 22 where a thicker layer is easier to produce but a thinner layer achieves greater responsiveness to the actuation energy.

Moreover, the movable layer 22 of the microphone 8 may be etched to provide damping holes 26. Damping holes 26 are provided to control ringing in the movable layer 22. The size, shape, spacing and numbering of damping holes 26 may be modified based on the microphone characteristics.

Figure 5:
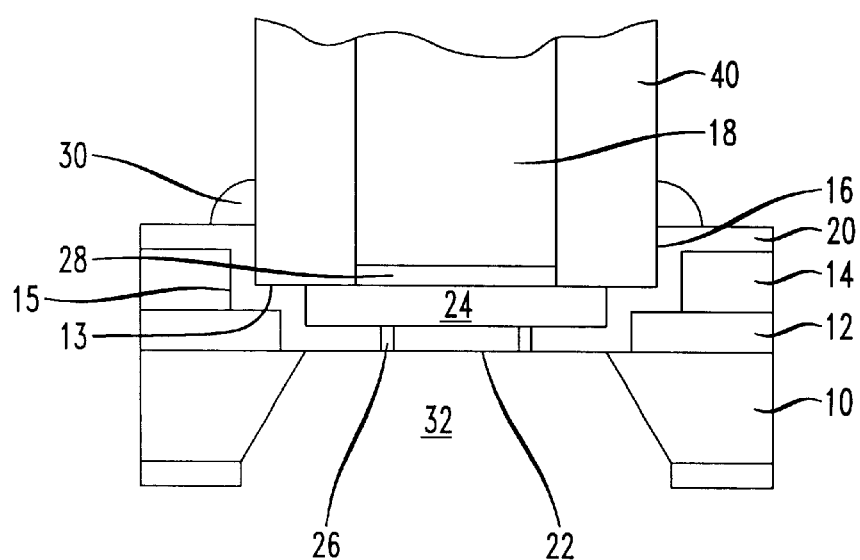
FIG. 5 shows the article of the present invention where a ferrule is used about the optic fiber.

The optical fiber 18 may be single mode, multimode, plastic coated, silica fiber and the like. Alternatively, as shown in FIG. 5, a ferrule 40 can be used about the fiber 18 to fix the fiber 18 to the microstructure 8, as is well known in the art, when the movable layer 22 is larger than the diameter of the optical fiber 18.

A coating is placed on the face of the terminal end of the optical fiber 18 which forms the non-movable layer 28 in a Fabrey-Perot cavity structure. The non-movable layer 28 can be a zinc sulfide film or other highly reflective material preferably having a refractive index of about 2.0 to 3.0 and most preferably about 2.3–2.4. The thickness of the coating is about ¼$\lambda$ in the preferred embodiment but can be adjusted according to the physical properties of the coating used, including the refractivity thereof, and size of the cavity 24.

The optical fiber 18 is preferably metalized on its perimeter to provide a wettable surface for solder 30 for fixing the optical fiber 18 to the microstructure 8. The optical fiber 18 is placed into the opening 15 in the receptacle layer 14 and is brought into contact with the film layer 20 on the spacer layer 12 for positioning in the x, y and z coordinates. The lateral position of the optical fiber 18 is set by lithographically defined opening in the receptacle layer 14 while the distance between the movable layer 22 and the non-movable layer 28, or z position, is generally set by the thickness of the spacer layer 12. The fiber 18 is then soldered to the microstructure 8 about the perimeter of the fiber 18 without the need for adhesive between the movable layer 22 and the non-movable layer 28.

Alternatively, when the movable layer 22 is larger than the diameter of the optical fiber 18 and a ferrule 40 is used, the ferrule 40 has a metalized perimeter to be soldered to the metalized film layer 20 of the microstructure 8. In such an embodiment, the ferrule 40 is brought into contact with the film layer 20 on the spacer layer 12 to set the z position (the space between the movable 22 and non-movable 28 layers). See FIG. 5. The fiber 18 is fixed to the microstructure 8 by solder 30 contacting the metalized film layer 20 about the perimeter of the ferrule 40, again without the need for adhesive between the movable layer 22 and the nonmovable layer 28.

Figure 4:
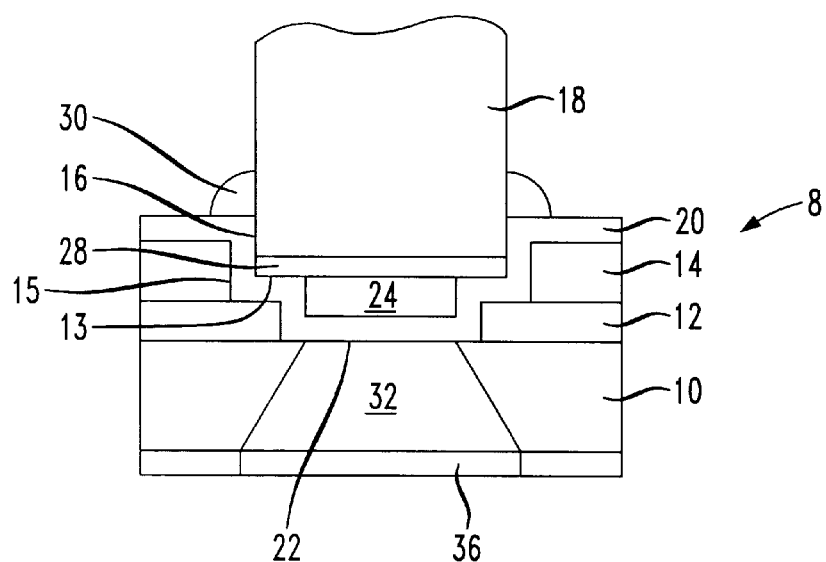
FIG. 4 shows an embodiment of an article according to the present invention wherein the microstructure is configured to modulate an optical signal in response to temperature changes.

In another embodiment of the present invention shown in FIG. 4, the article is configured to measure temperature. For the temperature measuring device the manufacturing method is modified to form a closed chamber 32. This may be accomplished by capping said portion of the silicon wafer beneath the optical cavity 24 by bonding a silicon wafer cap 36 with material of suitable optical property over the chamber 32 and filling it with a gas.

More specifically, a closed chamber 32 is formed within the wafer 10 beneath the movable layer 22. The chamber 32 is evacuated and capped. The chamber 32 thereby isolates the cavity 24 from variations in ambient pressure. The movable layer 22 only moves in response to changes in temperature that alter the pressure in the gas filled cavity 24. As a result, the reflectivity of the microstructure changes. Such a change in reflectivity can be correlated to the ambient temperature.

In another embodiment of the present invention, the article is configured to measure pressure. In the case of this embodiment there are no damping holes 26 and the cavity 24 is sealed. In operation the article as configured to measure pressure is exposed to fluid pressure and moves toward the non-movable layer 28. The change in position of the movable layer 22 causes a change in the cavity 24 resulting in a change in the reflectivity of the microstructure. The change in reflectivity can be correlated to the pressure exerted on the movable layer 22.

In yet another embodiment, not shown, the article can function as an optical modulator through the use of electrodes on the movable layer 22 and the nonmovable layer 28 with a voltage therebetween to provide a modulated optical signal as would be known in the art.

The preferred method for fabricating the present article of manufacture is shown in a representative process flow for an optical microphone in FIGS. 3A–3F. The fabrication process will be modified as necessary to accommodate structural requirements of other embodiments of the invention as described herein.

Figure 3A:
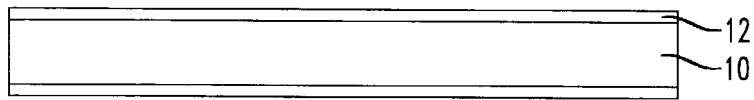
FIGS. 3A to 3F show the representative process flow for the method of manufacture of the present invention.

As shown in FIG. 3A, the microstructure includes a silicon wafer 10 which acts as a foundation or base layer. A spacer layer 12 of silicon dioxide is thermally grown over the silicon wafer 10 to a thickness equal to the desired size of the cavity 24.

Figure 3B:
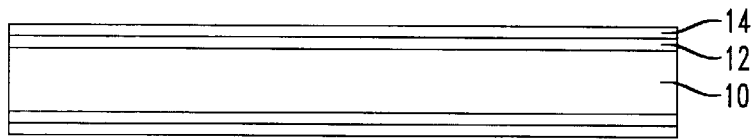
Figure 3C:
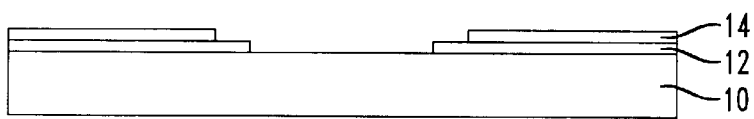

A receptacle layer 14 is deposited on the spacer layer 12 as shown in FIG. 3B and the receptacle layer 14 is then patterned through lithography or other suitable technique to permit alignment of the optical fiber 18 during attachment to the microstructure 8. The spacer layer 12 is pattern etched to open the optical cavity 24. See FIG. 3C.

Figure 3D:
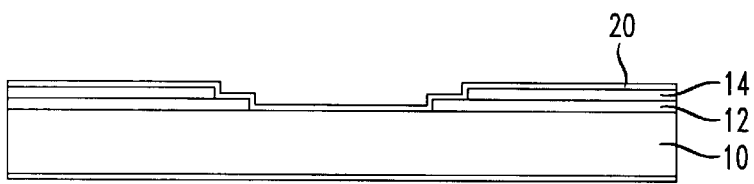

As shown in FIG. 3D, a film layer 20 of silicon nitride or some other suitable composition is deposited over the structure and forms the movable layer 22 of the optical cavity 24. The movable layer 22 may be etched patterned to provide damping holes 26 as desired for the particular application of the microstructure 8.

A metal ring (not shown) is preferably added to the top surface of the microstructure 8 surrounding the opening 16 to provide a wettable surface to solder the optical fiber 18, or ferrule 40 when used, to the microstructure 8.

Figure 3E:
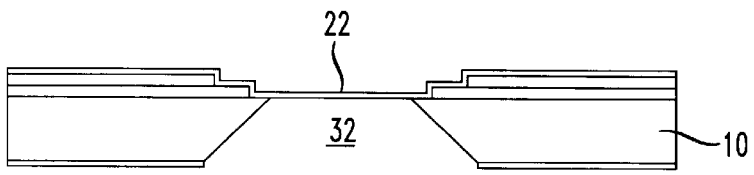
Figure 3F:
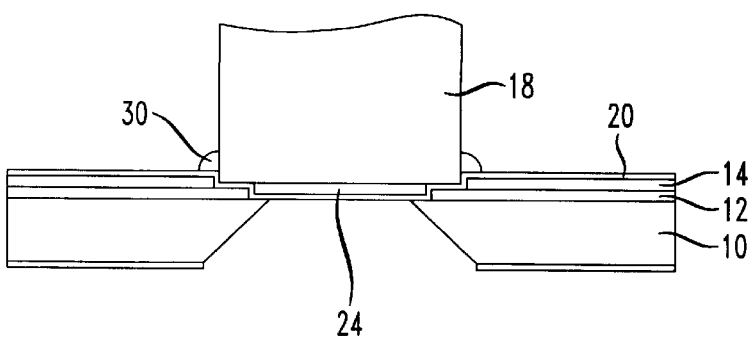

The silicon wafer 10 is then bulk micromachine etched to release the mechanically active area of the movable layer 22 thereby forming a chamber 32 as shown in FIG. 3E. Etchants typically found suitable for this application include potassium hydroxide (KOH) and ethylene diamine pyrocatechol (EDP).

The terminal end of the optical fiber 18 is coated with a highly reflective material such as zinc sulfide to form the non-movable layer 28 of the Fabrey Perot cavity structure. The coating 28 is preferably about ¼λ thick.

The optical fiber 18 is then metalized to form a wettable surface for soldering to the microstructure 8. The optical fiber 18 is placed in the opening 16 of the receptacle layer 14 and into contact with the stop 13 of the spacer layer 12 with the film layer 20 thereon. The fiber 18 is aligned in the x, y, and z, directions and is then fixed to the microstructure with a metal ring of solder 30. The solder 30 wets the top surface of the structure, and the perimeter of the optical fiber 18 about the opening 16. See FIG. 3F.

Once again, when the movable layer 22 is larger than the diameter of the fiber 18 a ferrule 40 is used. The ferrule 40 is metalized for soldering to the microstructure 8 and contacts the stop 13 of the spacer layer 12 for alignment in the z direction.

Figure 2:
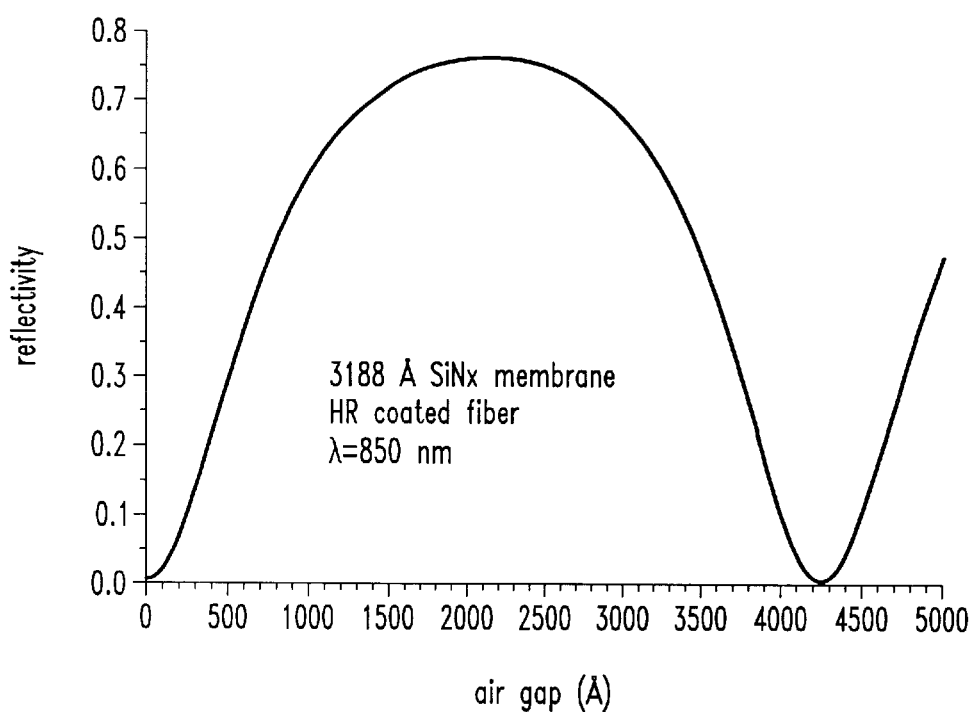
FIG. 2 shows the calculation of optical cavity for a $¾\lambda$ thick silicon nitride movable layer and a $¼\lambda$ thick high reflectivity coating on the terminal end of the optical fiber acting as the non-movable layer.

In operation, sonic energy from the lower surface of the microstructure 8 causes the movable layer 22 to move from an equilibrium position in relation to the non-movable layer 28 thereby changing the gap in the cavity 24. FIG. 2 shows the calculation of the reflectivity vs. the gap of the optical cavity for a ¾λ thick silicon nitride membrane and a ¼λ thick high reflectivity coating on the face of the terminal end of the optical fiber 18.

The present invention allows for the use of passive attachment techniques since the lateral position of the fiber 18 is set by the lithographically defined opening 15 in the receptacle layer 14, while the z position is set by the thickness of the spacer layer 12. In this regard, active alignment requires that light be passed through the fiber and measured to align the fiber with a microstructure 8. However, passive alignment requires only mechanical techniques without optical measurements requiring light through the optical fiber 18.

Variations to the above described product and method will make themselves apparent to one skilled in the art reading this disclosure. All such modifications are intended to fall within the spirit and scope of the present invention, limited only by the appended claims. All patents and publications cited herein are incorporated by reference.

We claim:

1. An article of manufacture including an optical fiber coupled to a microstructure, the article comprising;

a microstructure comprising a plurality of layers including a receptacle layer and a high reflectivity movable layer; and an optical fiber having a high reflectivity terminal end, said terminal end forming a non-movable layer;

wherein said receptacle layer has an opening aligned with said movable layer for receiving said terminal end of said optical fiber inserted into said opening and said optical fiber is fixed in relation to said microstructure so as to form a cavity between said non-movable layer of said fiber and said movable layer of said microstructure, said movable layer being physically adapted for moving relative to said non-movable layer under the influence of an actuating force.

2. The article defined in claim 1 wherein the microstructure further comprises a spacer layer to define the distance between the non-movable layer and the movable layer forming the cavity during equilibrium.

3. The article defined in claim 2 wherein said spacer layer is formed of silicon dioxide.

4. The article defined in claim 1 wherein the space between the movable layer and the non-movable layer is determined by the equation $$\frac{m\lambda}{2} \pm \epsilon$$

wherein m is a whole integer, $\lambda$ is wavelength and $\epsilon$ is between 0 and $\lambda/10$.

5. The article defined in claim 1 wherein the receptacle layer is formed of phosphosilicate glass film.

6. The article defined in claim 2 having a film layer deposited over a top surface of the microstructure, at least a portion of said film layer being affixed to said receptacle layer and said spacer layer, wherein the film layer comprises the movable layer.

7. The article defined in claim 1 wherein the movable layer is comprised of silicon nitride.

8. The article defined in claim 7 wherein the movable layer has a refractive index of between 1.9 and 2.2 and a thickness of about an odd multiple of ¼λ, wherein $\lambda$ is wavelength.

9. The article defined in claim 1 wherein said terminal end of said optical fiber comprises a coating of zinc sulfide film on its face.

10. The article defined in claim 9 wherein said zinc sulfide film has a refractive index between 2.0 and 3.0 and a thickness of about ¼λ, wherein $\lambda$ is wavelength.

11. The article defined in claim 1 wherein the fiber is fixed in relation to the microstructure by solder about the perimeter of the optic fiber.

12. The article defined in claim 1 further comprising a ferrule about the optic fiber fixed to the microstructure.

13. The article defined in claim 1 adapted for measuring pressure wherein said space between said non-movable layer of the fiber and said movable layer of the microstructure is sealed.

14. The article defined in claim 1 adapted for measuring temperature further comprising a closed chamber below said movable layer, said chamber being filled with a gas.

15. A method of manufacture comprising the steps of:
a) forming a microstructure comprising a movable layer and a receptacle layer, said receptacle layer having an opening therein aligned with said movable layer for receiving the terminal end of an optical fiber;
b) inserting a terminal end of an optical fiber into said opening, said terminal end comprising a high reflectivity terminal end forming a non-movable layer;
c) fixing the optic fiber in relation to the microstructure so as to form a cavity between the non-movable layer and of said fiber and said movable layer.

16. The method of manufacture as described in claim 15 further comprising the step of forming a spacer layer to set the distance between the non-movable layer end and the movable layer.

17. The method of manufacture as defined in claim 16 wherein the spacer layer is formed by thermally growing a layer of silicon nitride on a silicon wafer.

18. The method of manufacture as described in claim 15 wherein the step of forming the microstructure comprises the step of depositing a film layer over the receptacle layer, said film layer comprising the movable layer.

19. The method of manufacture as described in claim 15 wherein the distance between the non-movable layer and the non-movable layer is determined by the equation $$\frac{m\lambda}{2} \pm \epsilon$$

wherein m is a whole integer, $\lambda$ is wavelength and $\epsilon$ is between 0 and $\lambda/10$.

20. The method of manufacture as defined in claim 15 further comprising the step of coating the face of the terminal end of the optical fiber with a highly reflective material.

21. The method of manufacture as defined in claim 20 including the step of coating the face of the terminal end of the optical fiber with a zinc sulfide.

22. The method of manufacture as described in claim 15 including the step of bulk micromachining a silicon wafer to release a mechanically active area of a nitride membrane forming the movable layer.

23. The method of manufacture as described in claim 22 including the step of capping the bottom of the silicon wafer to form a closed chamber.

24. The method of manufacture as described in claim 15 further comprising the step of metabolizing the optical fiber to provide a wettable surface for soldering to the microstructure.

25. The method of manufacture as described in claim 15 where in the step of fixing the fiber to the microstructure comprises soldering at least a portion of the perimeter of the optical fiber to the microstructure.

26. The method of manufacture as described in claim 15 including the step of forming damping holes in the movable layer.

27. The method of manufacture as described in claim 15 further comprising of attaching a ferrule about the terminal end of the optical fiber.

28. The method of manufacture as described in claim 27 wherein the step of fixing the fiber to the microstructure comprises soldering at least a portion of the perimeter of the ferrule to the microstructure.

* * * * *